United States Patent [19]

Koshida et al.

[11] 4,341,803

[45] Jul. 27, 1982

[54] METHOD FOR PRODUCING DRY FRUIT CHIP

[76] Inventors: Daikichi Koshida, 1-19-10, Hotarugaike Nishi-Machi, Toyonaka-Shi, Osaka-Fu; Ko Sigisawa, 2-8-15, Chiyogaoka, Nara-Shi, Nara-Ken; Junji Majima, 12-21, Kita Showa-Machi, Nishinomiya-Shi, Hyogo-Ken; Ryuichi Hattori, 96 Koyama Higashi Ohno-Cho, Kita-Ku, Kyoto-Shi, Kyoto-Fu, all of Japan

[21] Appl. No.: 231,911

[22] Filed: Feb. 5, 1981

[30] Foreign Application Priority Data

Feb. 5, 1980 [JP] Japan .................................. 55-11997

[51] Int. Cl.³ .............................................. A23B 7/02
[52] U.S. Cl. .......................................... 426/242; 34/4; 34/15; 426/385; 426/640
[58] Field of Search ............... 426/385, 242, 640, 615, 426/447; 34/15, 4; 219/10.55 M

[56] References Cited

U.S. PATENT DOCUMENTS

| 2,110,184 | 3/1938 | Webb .................. | 426/447 |
| 2,110,821 | 3/1938 | Rea et al. ............. | 34/15 |
| 3,462,281 | 8/1969 | Macy ................... | 426/385 |
| 4,096,283 | 6/1978 | Rahman ................ | 426/242 |

OTHER PUBLICATIONS

Wiley, "Quality of Processed Apple Products", presented at Farm & Home Week, Orono, Apr. 1, 1964, pp. 53-59.

"Freeze-Drying", Bakers' Review, Apr. 7, 1961, p. 574.

*Primary Examiner*—Raymond N. Jones
*Assistant Examiner*—George C. Yeung
*Attorney, Agent, or Firm*—Armstrong, Nikaido, Marmelstein & Kubovcik

[57] ABSTRACT

A method for producing dry fruit chips in which starting fruit chips having an adjusted water soluble sugar concentration are freeze-dried to reduce the moisture content to a predetermined moisture content range, the freeze-dried fruit chips are microwave-dried to further reduce the moisture content to a second predetermined range and the microwave-dried fruit chips are vacuum-dried to still further reduce the moisture content to a range suitable for ready eating as snack fruit.

5 Claims, No Drawings

METHOD FOR PRODUCING DRY FRUIT CHIP

BACKGROUND OF THE INVENTION

This invention relates to a method for producing dry fruit in the form of chip which is ready for eating as snack fruit and more particularly, to a method for producing dry fruit in the form of chip which provides a pleasant touch to the teeth and is ready for eating as snack fruit by drying fruit chips which have been previously adjusted to a suitable water-soluble sugar concentration at three different successive drying stages under different conditions particularly specified for these drying stages, respectively.

A number of methods for drying fruit chips have been proposed as well as those for drying vegetables to provide foods ready for eating. However, most of the prior art methods for drying fruit chips have been developed to provide fruit chips as instant foods which are adapted to be reconstituted with hot water when the chips are cooked or eaten after drying thereof. Thus, the obtained dry fruit chips are not those ready for eating as snack fruit and especially, such dry fruit chips fail to give such a pleasant touch to the teeth as called for snack fruit.

Dry fruit chips as snack fruit are not old in Japan and as a result, only a relatively small number of technologies have been developed up to date in Japan. Representative examples of the snack fruit technologies will be briefly described hereinbelow. Fruit is first removed its skin and core therefrom and then cut and trimmed to chips having a suitable shape and size. The fruit chips are immersed in one selected from various available syrup solutions and then subjected to a suitable drying treatment. The prior art drying methods include the oil-frying method, the freeze-drying method and the vacuum-drying method.

The oil-frying has the disadvantages that the oxidation of the oil deteriorates the flavor of the product and that the oil adversely affects the taste of the product (the taste becomes heavy).

The freeze-drying has the disadvantages that the drying requires a rather long time period and accordingly, is expensive and that the dry fruit chips obtained by the freeze-drying are suitable for reconstitution with hot water or the like because such fruit chips have a porous structure, but the porous structure lacks in pleasantness to the teeth as snack fruit ready for eating.

The vacuum-drying has the disadvantage that the obtained dry fruit chips have a reduced bulk rather than a porous structure and are too hard for snack fruit far from a pleasant touch to the teeth.

Therefore, the inventors have endeavoured to develop a method for producing dry fruit chips which are quite pleasant to the teeth and maintain their inherent bulk while eliminating the disadvantages inherent in the prior art methods for producing dry fruit chips ready for eating as snack fruit. And the inventors have found that in order to obtain dry fruit chips which are pleasant to the teeth, it is quite important to uniformly disperse a water-soluble sugar solution throughout fruit chips in a high concentration and dry the fruit chips while further increasing the concentration of the water-soluble sugar solution.

Through further strenuous research on fruit chip drying, the inventors have found that when fruit chips which have been subjected to a suitable pre-treatment are dried through three successive different drying stages, that is, freeze-drying, vacuum-drying and microwave-drying under vacuum, under different drying conditions specified for the three different drying stages, respectively, dry fruit chips pleasant to the teeth can be produced in a brief time period. It has been further found that the thus produced dry fruit chips retain their inherent flavor and taste and that the concentration of the water-soluble sugar in the fruit chips prior to the drying has an important influence upon the quality of the resultant dry fruit chips.

From the findings referred to above, the inventors have come to the drying principle for fruit chips in which fruit chips which have been adjusted to a specific water-soluble sugar concentration are first subjected to freeze-drying to evaporate a predetermined amount of water from the moisture content therein while maintaining the original shape, freshness and taste, the freeze-dried fruit chips are then subjected to microwave-drying under vacuum to thaw the remaining moisture content present in the form of ice crystal and evaporate a predetermined amount of water from the thawed moisture content while uniformly dispersing the thawed moisture content throughout the chips to provide fruit chips having the water-soluble sugar dispersed uniformly therein and the resulting fruit chips are subjected to vacuum-drying to further increase the water-soluble sugar concentration therein.

U.S. Pat. No. 4,096,283 discloses a process for making a dehydrated and compacted food mass selected from the group consisting of vegetables and meats which comprises the steps of partially freeze-drying a food, irradiating the partially freeze-dried food with microwave radiations, compacting the microwave-irradiated food and oven-drying the compacted food. However, the prior art of this U.S. patent is directed to a process for making dehydrated and compacted food such as vegetable or meat which can be rehydrated to the state prior to drying thereof and is quite different from the method for making dry fruit chips ready for eating as snack fruit. Thus, the prior art of this U.S. patent is not applicable to the making of drying fruit chips ready for eating as snack fruit to which the present invention is directed.

SUMMARY OF THE INVENTION

Therefore, the present invention is to provide a novel and improved method for producing dry fruit chips based on the drying principle derived from the above-mentioned findings.

According to the present invention, there has been provided a method for producing dry fruit chips which essentially comprises the steps of freeze-drying fruit chips which have been previously adjusted to a suitable water-soluble sugar concentration in the range of 6–25% by weight to dehydrate to a moisture content in the range of 15–60% by weight, irradiating the dehydrated fruit chips with microwave radiations under vacuum to further dehydrate the chips to a moisture content in the range of 10–40% by weight and vacuum-drying the redehydrated fruit chips to a moisture content below 5% by weight to thereby provide dry fruit chips ready for eating as snack fruit.

PREFERRED EMBODIMENTS OF THE INVENTION

Fruits to be treated by the method of the present invention include apples, peaches, melons, apricots, persimmons and papayas, for example.

Prior to the drying treatment of the fruits, a selected one of the above-mentioned fruits is removed the skin and core therefrom and then cut and trimmed to chips of a suitable shape and size by the conventional procedure. In order to perform the subsequent treatment stages efficiently, the fruit is preferably cut and trimmed to chips having a thickness of about 2-6 mm.

The water-soluble sugar concentration in the fruit chips is adjusted to 6-25% by weight and the term "water-soluble sugar" employed herein means monosaccharides such as glucose, arabinose, xylose, galactose and fructose, disaccharides such as sucrose, lactose, maltose and cellobiose, trisaccharides such as raffinose and malt triose, tetrasaccharide such as stachyose, polysacharide such as dextrin and sugar alcohols such as sorbitol and mannitol.

The water-soluble sugar concentration in fruit chips has a great influence on the touch to the teeth and especially, a moderate hardness to be imparted to the final dry fruit chips. The water-soluble sugar concentration in the fruit chips is selected so as to give a desired pleasantness or touch to the teeth to the final dry fruit chips. In order to attain the purpose of the present invention, the water-soluble sugar concentration in the material or starting fruit chips should be in the range of 6-25% by weight. When the water-soluble sugar concentration in the starting fruit chips is below 6% by weight, even if the fruit chips are subjected to the successive drying treatments, the resultant dry fruit chips will not have a moderate hardness suitable for snack fruit. On the other hand, when the water-soluble sugar concentration exceeds 25% by weight, the final dry fruit chips will have an excessive amount of water-soluble sugar dispersed therein, and as a result, when the fruit chips are dried by the method of the present invention, the water-soluble sugar in such an amount solidifies to thereby give a touch to the teeth to the final dry fruit chips which is different from the intended pleasantness or touch to the teeth. When the starting fruit chips already have a water-soluble sugar concentration in the range of 6-25% by weight before the chips are dried by the method of the present invention, such fruit chips can be immediately subjected to the successive treatments without the pre-treatment for sugar concentration adjustment.

The water-soluble sugar concentration adjustment is preferably performed by immersing the starting fruit chips into a syrup solution. Although the components of the syrup solution may be conventional ones provided that a water-soluble sugar is employed as the principal component, one preferable syrup solution comprises 5-30% by weight of water-soluble sugar and 0.1-0.5% by weight of quality stabilizer. Although any one of the above-mentioned sugars may be suitably employed, the most preferable one among the sugars is sucrose because the particular sugar is easy in adjusting the touch to the teeth, light in sweetness, capable of resisting to browning, easily soluble and low viscosity even in a high concentration. Quality stabilizers useful in the present invention include L-ascorbic acid, D-isoascorbic acid, sodium L-ascorbic acid and polymerized phosphate.

The immersion of the starting fruit chips cut and trimmed in a syrup solution may be performed either at atmospheric pressure or under vacuum. The vacuum-immersion has the advantage that the fruit chips are effectively impregnated with the syrup components in a relatively brief time period. The vacuum immersion is preferably performed at room temperature and a vacuum below $-60$ cmHg to fully exhibit the effectiveness of vacuum-immersion.

The starting fruit chips which have been previously adjusted to a water-soluble sugar concentration in the range of 6-25% by weight are then subjected to the drying treatment by the method of the present invention and the drying treatment constitutes the most important aspect of the present invention. The drying treatment is necessarily performed in successive three stages, that is, freeze-drying, microwave irradiation under vacuum and vacuum-drying. The three drying stages should be in succession performed in the above-mentioned sequence and the elimination of one or two of the three drying stages will not produce dry fruit chips having excellent touch or pleasantness to the teeth to which the present invention is directed.

Furthermore, in addition to the above-mentioned factors for producing dry fruit chips to which the present invention is directed, the following conditions should be met for each of the three drying stages. That is, in the first or freeze-drying, the starting fruit chips are dried to have a moisture content in the range of 15-60% by weight, in the second or microwave irradiation under vacuum, the freeze-dried fruit chips are dried to have a moisture content in the range of 10-40% by weight and in the final or vacuum drying, the fruit chips which have passed through the two preceding drying stages are dried to have a moisture content below 5% by weight, respectively. Failure of any one of the drying conditions can not produce dry fruit chips to which the present invention is directed.

The operative effects of the drying stages and the requirements called for the drying stages are the followings:

The freeze-drying is performed to reduce the moisture content in the starting fruit chips so as to maintain the original volume and the inherent taste of the fruit chips and the microwave irradiation under vacuum is performed so as to increase the water-soluble sugar concentration in the freeze-dried fruit chips. Thus, the drying degree by the freeze-drying depends upon the moisture content necessary for the microwave irradiation under vacuum to uniformly disperse the remaining moisture content which is present in the form of ice crystal throughout the fruit chips and dissolve the water-soluble sugar into the remaining moisture content to thereby further increase the concentration of the water-soluble sugar in the fruit chips. According to the present invention, the freeze-drying reduces the moisture content in the fruit chips to a value in the range of 15-60% by weight.

After the freeze-drying, if the thus dried fruit chips have a moisture content below 15% by weight, the microwave-irradiation under vacuum can not attain the purpose to increase the water-soluble sugar concentration in the fruit chips and uniformly disperse the water-soluble sugar in the increased concentration, but also cause apparent burns to appear on the fruit chips when subjected to the microwave irradiation under vacuum. On the other hand, when the fruit chips have a moisture content in excess of 60% by weight after the freeze-drying, in order to uniformly disperse the water-soluble sugar in a high concentration throughout the fruit chips by the microwave irradiation under vacuum, it is necessary to extend the time period of the microwave irradiation drying and increase the output of the microwaves leading to the occurrence of burns. In order to reduce the moisture content in the fruit chips by the freeze-drying to a value in the range of 15–60% by weight, the temperature of the subject fruit chips is preferably controlled to a value below 30° C. under a vacuum in the range of 0.1–0.2 torr.

After the starting fruit chips have been dried to a certain extent through the freeze-drying, the dried fruit chips are subjected to the microwave irradiation under vacuum in which the remaining moisture content present in the form of water crystal is thawed and uniformly dispersed and scattered throughout the fruit chips. The water-soluble sugar is dissolved into the dispersed moisture content to provide a high concentration water-soluble sugar solution and further reduce the moisture content in the fruit chips to a value in the range of 10–40% by weight.

The uniform dispersion of the water-soluble sugar throughout the fruit chips is essential to give a moderate touch or pleasantness to the teeth to the final dry fruit chips. The uniform dispersion of the water-soluble sugar solution should be carried out during the microwave irradiation under vacuum and it is also necessary to perform the microwave drying until the moisture content in the fruit chips reduces to a value in the range of 10–40% by weight. If the microwave irradiation under vacuum is carried out at atmospheric pressure rather than under vacuum, the reduction in volume and the loss in taste are conspicuous to thereby render the resulting dry fruit chips unsuitable for eating as snack fruit. And if the microwave irradiation under vacuum is carried out until the moisture content is reduced to a value below 10% by weight, the dry fruit chips become moldy and burn to thereby lose the inherent taste of the fruit.

After the microwave irradiation under vacuum drying stage, when the thus treated fruit chips have a moisture content in excess of 40% by weight, the subsequent vacuum-drying should be performed by extending the drying time period or increasing the drying temperature which results in the reduction in volume of and the occurrence of burning in the final dry fruit and thus, the drying efficiency is low.

If only the freeze-drying stage out of the above-mentioned two successive drying stages (the freeze-drying and microwave irradiation under vacuum drying) is employed, it is not possible to uniformly disperse the water-soluble sugar in a high concentration throughout the fruit chips and as a result, dry fruit chips to which the present invention is directed can not be obtained. Alternatively, only the microwave under vacuum drying is employed out of the two successive drying stages, the reduction in volume, the loss in fruit taste, the mustiness and burns occur. Thus, the freeze-drying and microwave irradiation under vacuum drying are closely related to each other in order to achieve the purpose of the present invention.

After the freeze-drying stage, when the dried fruit chips are to be transferred to the microwave irradiation under drying stage, in order to prevent the reduction in volume, the freeze-dried fruit chips are preferably transferred rapidly while maintaining the frozen state. And the conditions under which the microwave irradiation under vacuum is performed should be determined so as to keep the temperature of the fruit chips at a low value to thereby reduce the occurrence of potential burns (the occurrence of glow discharge). To put it concretely, it is preferred that vacuum is maintained at 30 torr and the temperature of the fruit chips does not exceed 30° C.

After having passed through the above-mentioned two drying stages, the treated fruit chips are subjected to the final or vacuum-drying stage where the fruit chips are finally dried under vacuum to become the final dry fruit chips to which the present invention is directed. The effect of the vacuum-drying is to partially evaporate the moisture content in the high concentration water-soluble sugar in the fruit chips so as to increase the concentration of the sugar and solidify the fruit chips while maintaining the fruit chips at a moderate temperature and prevent the reduction in volume. The thus obtained fruit chips have a moderate hardness suitable for eating and a pleasant touch to the teeth. The final or vacuum-drying is continued until the moisture content in the fruit chips is reduced to a value below 5% by weight under vacuum of 10–30 torr. The moisture content in the final dry fruit chips is principally selected taking a desired pleasantness or touch to the teeth and the preservability of the fruit chips.

As mentioned hereinabove, the water-soluble sugar concentration in the final dry fruit chips and the functions of the various drying stages are importantly related to each other and only when the important mutual relationship is maintained, desirable dry fruit chips having excellent touch to the teeth can be produced in a relatively short time period.

Comparative Experiments 1

(The present invention)

Fresh apples are removed their skins and cores therefrom by the conventional procedure and then cut and trimmed by a slice cutter to obtain 5 kg of sector-shaped apple chips each having the thickness of 4 mm, inner or shorter arc of 10 mm, outer or longer arc of 25 mm and width of 20 mm. The 5 kg of apple chips were immersed in 20 kg of a syrup solution comprising 4 kg of sucrose, 0.06 kg of L-ascorbic acid and 15.9 kg of water at room temperature and atmospheric pressure to obtain about 7 kg of apple chips having the water-soluble sugar concentration of 11.9% by weight and the apple chips had the moisture content of 85.8% by weight. The apple chips were rapidly frozen at a temperature below −30° C. and then freeze-dried under the conditions of vacuum of 0.1 torr and rising temperature up to 30° C. for two hours to reduce the moisture content of the apple chips to 30% by weight to thereby obtain about 1.4 kg of apple chips. Immediately after the freeze-drying treatment, the 1.4 kg of the apple chips were irradiated with microwaves having the output of 4.5 KW under the conditions of vacuum in the range of 15–30 torr and rising temperature up to 30° C. for one minute to reduce the moisture content in the apple chips to 20% by weight to thereby obtain about 1.2 kg of apple chips. The 1.2 kg of apple chips were vacuum-dried under the conditions of vacuum in the range of 10–30 torr and rising temperature up to 50° C. to obtain about 1 kg of dry apple chips having the moisture content of 5% by weight.

(Control 1)

The drying procedure was similar to that described hereinabove in connection with the present invention in Comparative Experiments 1 except that the apple chips had the water-soluble sugar concentration of 5% by weight after the syrup solution immersion treatment.

(Control 2)

The drying procedure was similar to that described hereinabove in connection with the present invention in Comparative Experiments 1 except that the apple chips had the water-soluble sugar concentration of 30% by weight after the syrup solution immersion treatment.

The apple chips obtained by the present invention and Controls 1 and 2 were eaten to determine the touch to the teeth for comparison purpose and it was found that the apple chips by the present invention exhibited a moderate hardness and a quite pleasant touch to the teeth as snack fruit while the apple chips by Control 1 exhibited insufficient hardness and pulpy touch to the teeth and those by Control 2 exhibited excessively high hardness and offered resistance to the teeth. Thus, it was found that the apple chips by Controls 1 and 2 were not acceptable as snack fruit.

Comparative Experiments 2

(The present invention)

The drying procedure was the same as that described hereinabove in connection with the present invention in Comparative Experiments 1.

(Control 3)

About 7 kg of apple chips having the water-soluble sugar concentration of 11.9% by weight and the moisture content of 85.8% by weight obtained by the syrup solution immersion treatment as described in connection with the present invention in Comparative Experiments 1 were freeze-dried under the conditions of vacuum of 0.1 torr and rising temperature up to 30° C. for four hours to obtain about 1 kg of apple chips having the reduced moisture content of 5% by weight.

(Control 4)

About 7 kg of apple chips having the water-soluble sugar concentration of 11.9% by weight and the moisture content of 85.8% by weight obtained by the syrup solution immersion treatment as described in connection with the present invention in Comparative Experiments 1 were irradiated with microwaves having the output of 4.5 KW under the conditions of vacuum in the range of 10-30 torr and rising temperature up to 30° C. for three minutes to reduce the moisture content in the apple chips to 20% by weight. However, apparent burns occurred on the apple chips and the subsequent drying stages had to be suspended.

(Control 5)

About 7 kg of apple chips having the water-soluble sugar concentration of 11.9% by weight and the moisture content of 85.8% by weight obtained by the syrup solution immersion treatment as described in connection with the present invention in Comparative Experiments 1 were freeze-dried under the conditions of vacuum of 0.1 torr and rising temperature up to 30° C. for two hours to obtain about 1.4 kg of apple chips having the moisture content of 30% by weight. Immediately after the freeze-drying stage, the apple chips were irradiated with microwaves having the output of 4.5 KW under the conditions of vacuum in the range of 15-30 torr and rising temperature up to 30° C. to obtain about 1 kg of dry apple chips having the moisture content of 5% by weight.

(Control 6)

About 7 kg of apple chips having the water-soluble sugar concentration of 11.9% by weight and the moisture content of 85.8% by weight obtained by the syrup solution immersion treatment as described in connection with the present invention in Comparative Experiments were freeze-dried under the conditions of vacuum of 0.1 torr and rising temperature up to 30° C. for one hour to obtain 2.4 kg of apple chips having the moisture content of 60% by weight. Immediately after the freeze-drying stage, the apple chips were irradiated with microwaves having the output of 4.5 KW under the conditions of vacuum in the range of 15-30 torr and rising temperature up to 30° C. for three minutes to obtain about 1 kg of dry apple chips having the moisture content of 8% by weight.

(Control 7)

About 1 kg of dry apple chips having the moisture content of 5% by weight were obtained by following the procedure as described hereinabove in connection with the present invention in Comparative Experiments 1 except that the microwave irradiation under vacuum drying was performed at atmospheric pressure.

The various dry chips obtained by the comparative experiments were examined for their functions and the results of the examinations will be given in the following Table 1.

TABLE 1

| | Total drying time | Appearance | Shape | Touch to teeth | Taste | Appraisal |
|---|---|---|---|---|---|---|
| Present invention | 2.5 hrs | 5 | 5 | 5 | 5 | Most suitable as snack fruit |
| Control 3 | 4 hrs | 5 | 5 | 2 | 5 | Touch to teeth like marshmallow |
| Control 4 | — | 1 | 1 | 1 | 1 | Apparent burns and unacceptable as merchandise |
| Control 5 | 2 hrs | 3 | 5 | 3 | 2 | Burns, lowered fruit taste and uneven touch to teeth |
| Control 6 | 1 hr | 2 | 3 | 2 | 1 | Similar to Control 3 and reduction in volume by drying |
| Control 7 | 3 | 4 | 2 | 2 | 2 | Reduction in volume |

TABLE 1-continued

| Total drying time | Appearance | Shape | Touch to teeth | Taste | Appraisal |
|---|---|---|---|---|---|
| hrs | | | | | and unpleasant touch to teeth |

Note:
The numeral appraisal results as shown in Table 1 will be defined as follows:

Appearance (degree of burning)

1. Burns occurred over the entire surface of dry apple chips.
2. Apparent burns occurred on the periphery of dry apple chips.
3. Burns occurred on a portion of the periphery of dry apple chips.
4. Almost no burns occurred.
5. No burns occurred.

Shape (degree of reduction in volume)

1. Substantial reduction in volume by drying occurred over the entire surface of dry apple chips.
2. Substantial reduction in volume by drying occurred in the center of dry apple chips.
3. Somewhat reduction in volume by drying occurred in the center of dry apple chips.
4. Almost no reduction in volume by drying.
5. No reduction in volume by drying.

Touch to teeth (touch to teeth as snack fruit)

1. Unsuitable for eating.
2. Touch to teeth different from that of snack fruit.
3. Lack in soft touch to teeth. 4. No resistance to teeth.
5. Pleasant touch to teeth.

Taste (taste of fresh fruit)

1. No fruit taste.
2. Substantial moldy and burning smell.
3. Somewhat musty and burning smell.
4. Less apple taste.
5. Pleasant taste.

As clear from the results of Comparative Experiments 1 and 2 as mentioned hereinabove, it is apparent that dry apple chips obtained by the method which met the requirements specified by the present invention were most suitable for eating as snack fruit and the same is also applicable to fruits other than apples. The drying time period in the present invention is relatively short and thus, the drying efficiency of the present invention is equal to or higher than those of the conventional methods.

The present invention will be now described by way of preferred examples in which the present invention was successfully carried out.

EXAMPLE 1

Prior to the drying by the present invention, fresh apples were removed their skins and cores therefrom by the conventional procedure and then cut and trimmed by a slice cutter to obtain 5 kg of sector-shaped apple chips each having the thickness of 4 mm, inner or shorter arc of 10 mm, outer or longer arc of 25 mm and width of 20 mm. The 5 kg of apple chips wwere immersed in 20 kg of a syrup solution comprising 1 kg of sucrose, 0.06 kg of L-arcobic acid and 18.94 kg of water at room temperature and atmospheric pressure to obtain about 7 kg of apple chips having the moisture content of about 90% by weight and water-soluble sugar concentration of 7.9% by weight.

The 7 kg of syrup-impregnated apple chips were then rapidly frozen at a temperature below $-30°$ C. and freeze-dried under the conditions of vacuum of 0.1 torr and rising temperature up to 30° C. for 2.5 hours to obtain about 1 kg of apple chips having the moisture content of 30% by weight. Immediately after the freeze-drying, the apple chips were irradiated with microwaves having the output of 4.5 KW under the conditions of vacuum in the range of 15–30 torr and rising temperature up to 30° C. for one minute to obtain about 0.9 kg of apple chips.

Thereafter, the apple chips were vacuum-dried under the conditions of vacuum in the range of 10–30 torr and rising temperature up to 50° C. for thirty minutes to obtain about 0.8 kg of dry apple chips having the moisture content of 5% by weight. The thus obtained dry apple chips were excellent with respect to appearance, shape and fruit taste and also exhibited a light and pleasant touch to the teeth and were quite suitable as snack fruit.

EXAMPLE 2

Prior to the drying by the method of the present invention, fresh apples were removed their skins and cores therefrom by the conventional procedure and then cut and trimmed by a slice cutter to obtain 5 kg of sector-shaped apple chips each having the thickness of 4 mm, inner or shorter arc of 10 cm, outer or longer arc of 25 mm and width of 20 mm. The 5 kg of apple chips were immersed in 20 kg of a syrup solution comprising 4 kg of sucrose, 0.06 kg of L-ascorbic acid and 15.94 kg of water under the conditions of room temperature and vacuum of up to 160 torr to obtain about 7 kg of apple chips having the water-soluble sugar concentration of 11.9% by weight and moisture content of about 86% by weight.

The apple chips were then rapidly frozen at a temperature below $-30°$ C. and vacuum-dried under the conditions of vacuum of 0.1 torr and rising temperature up to 30° C. for two hours and forty minutes to obtain about 1.1 kg of apple chips having the moisture content of 15% by weight and immediately after the vacuum-drying treatment, the apple chips were irradiated with microwaves having the output of 4.5 KW under the conditions of vacuum in the range of 15–30 torr and rising temperature up to 30° C. for one minute to obtain about 1 kg of apple chips having the moisture content of 10% by weight.

Thereafter, the apple chips were vacuum-dried under the conditions of vacuum in the range of 10–30 torr and rising temperature up to 50° C. for twenty minutes to obtain about 1 kg of dry apple chips having the moisture content of 5% by weight.

The thus obtained dry apple chips were comparable with those obtained by Example 1 and exhibited excellent properties as snack fruit chips.

EXAMPLE 3

5 kg of pineapple chips cut and trimmed by the same procedure as that employed in Example 2 were immersed in 20 kg of a syrup solution comprising 6.4 kg of sucrose, 0.02 kg of L-ascorbic acid and 13.58 kg of water under the conditions of room temperature and vacuum up to 160 torr and the thus treated pineapple chips were again immersed in the above-mentioned syrup solution under the conditions of room temperature and atmospheric pressure to obtain about 7 kg of pineapple chips having the moisture content of 78% by weight and water-soluble sugar concentration of about 20% by weight.

The about 7 kg of pineapple chips were freeze-dried under the same conditions as those employed in Example 2 for about five hours to obtain about 1.8 kg of pineapple chips having the moisture concentration of 15% by weight and immediately after the freeze-drying, the pineapple chips were subjected to microwave-irradiation drying under the same conditions as those employed in Example 2 for about one minute to obtain about 1.7 kg of pineapple chips having the moisture content of 10% by weight.

The pineapple chips were then vacuum-dried under the same vacuum drying conditions as those employed in Example 2 for about three hours to obtain about 1.6 kg of dry pineapple chips having the moisture content of 5% by weight.

The thus obtained dry pineapple chips were comparable with those obtained in Example 1 and exhibited excellent properties as snack fruit chips.

EXAMPLE 4

Muskmelons (having the moisture content of 91% by weight) ripe for ready eating were cut and trimmed by the same procedure as that employed in Example 2 to obtain 5 kg of muskmelon chips and the chips had the water-soluble sugar concentration of 6.2% by weight.

The 5 kg of muskmelon chips were directly freeze-dried under the same freeze-drying conditions as those employed in Example 2 for about four hours without passing through the syrup solution immersion treatment to obtain about 0.8 kg of muskmelon chips having the moisture content of 40% by weight and immediately after the freeze-drying treatment, the pineapple chips were irradiated with microwaves under vacuum employing the same microwave irradiation conditions as those employed in Example 2 to obtain about 0.6 kg of muskmelon chips having the moisture content of 20% by weight.

Thereafter, the muskmelon chips were vacuum-dried under the same vacuum-drying conditions as those employed in Example 2 for about two hours to obtain about 0.47 kg of dry muskmelon chips having the moisture content of 5% by weight.

The thus obtained dry muskmelon chips were comparable with the dry apple chips obtained in Example 1 with respect to properties as snack fruit.

While preferable examples of the invention have been described in detail, it will be understood that the same are for illustration purpose only and not to be taken as a definition of the invention, reference being had for this purpose to the appended claims.

What is claimed is:

1. A method for producing dry fruit chips for ready eating as snack fruit comprising the steps of freeze-drying fresh fruit chips having a predetermined volume and an adjusted water-soluble sugar concentration in the range of 6–25% by weight to reduce the moisture content in said fresh fruit chips to 15–60% by weight so as to maintain the predetermined volume of said fruit chips, microwave irradiation-drying said freeze-dried fruit chips under vacuum to thaw the remaining moisture content and to uniformly disperse the water-soluble sugar concentration throughout said freeze-dried fruit chips and to further reduce the moisture content to 10–40% by weight, and vacuum-drying said microwave-irradiation dried fruit chips to still further reduce the moisture content to below 5% by weight so as to produce dry fruit chips having a moderate hardness.

2. The method for producing dry fruit chips for ready eating as snack fruit as set forth in claim 1, in which said fresh fruit chips are chips of one member selected from the group consisting of apple, peach, melon, apricot, persimmon and papaya.

3. The method for producing dry fruit chips for ready eating as snack fruit as set forth in claim 1, in which said water soluble sugar is one member selected from the group consisting of monosaccharides, disaccharides, trisaccharides, tetrasaccharide, polysaccharide and sugar alcohols.

4. The method for producing dry fruit chips for ready eating as snack fruit as set forth in claim 3, in which said monosaccharides include glucose, arabinose, xylose, galactose and fructose, said disaccharides include sucrose, lactose, maltose and cellobiose, said trisaccharides include raffinose and malt tricose, said tetrasaccharide is stachyose, said polysaccharide is dextrin and said sugar alcohols include sorbitol and mannitol.

5. The method for producing dry fruit chips for ready eating as snack fruit as set forth in claim 1, in which said freeze-drying is conducted under the conditions of vacuum of 0.1 torr and rising temperature up to 30° C., said microwave irradiation-drying is conducted under the conditions of vacuum in the range of 15–30 torr and rising temperature up to 30° C. with the microwave output of 4.5 KW and said vacuum-drying is conducted under the conditions of vacuum in the range of 10–30 torr and rising temperature up to 50° C.

* * * * *